(12) United States Patent
Sinha et al.

(10) Patent No.: US 6,389,813 B2
(45) Date of Patent: May 21, 2002

(54) PASSIVE MOUNTED LINING SYSTEM

(75) Inventors: Biswanath Sinha, Madison; Daniel P Crow, Verona; David F Littmann, Stoughton, all of WI (US)

(73) Assignee: Quiet Systems International, LLC, Madison, WI (US)

( * ) Notice: Subject to any disclaimer, the term of this patent is extended or adjusted under 35 U.S.C. 154(b) by 0 days.

(21) Appl. No.: 09/822,776

(22) Filed: Mar. 30, 2001

Related U.S. Application Data

(60) Provisional application No. 60/193,742, filed on Mar. 31, 2000.

(51) Int. Cl.$^7$ ................................................ F01B 31/06
(52) U.S. Cl. .......................................... 60/687; 60/685
(58) Field of Search .................................. 60/685, 687

(56) References Cited

U.S. PATENT DOCUMENTS

| | | | | |
|---|---|---|---|---|
| 2,394,685 A | * | 2/1946 | Hall | 60/687 |
| 2,787,124 A | * | 4/1957 | Donahue | 60/687 |
| 4,593,526 A | * | 6/1986 | Pankowiecki | 60/687 X |
| 4,840,803 A | | 6/1989 | Polizzano | |

OTHER PUBLICATIONS

"Gas Turbine Exhaust Control System" Bachmann Industries, Inc. Apr. 1997, winword/catalog/catgtecs.doc.
Gas Turbin Exhaust System and Component Damper Expansion Joint ISO–900 Bachmann Industries, Inc.
F122 Beam Welding Attachment Feb. 27, 2000, http://www.pipesupports.com/Sales/catalog/clips/F122.htm.
F123 Beam Bolting Attachment Feb. 27, 2000, http://www.pipesupports.com/Sales/Catalog/Clips/F123.htm.
Introduction to Heat Transfer Frank P. Incropera, David P. DeWitt School of Mechanicla Engineering, Purdue University 1985, 1990.
Mechanics of Materials Ferdinand P. Beer, E. Russell Johnston, Jr. 1981 McGraw–Hill Inc.
Austin hardware & Supply p. 469.
Sound Control for Commerical and Residential Buildings, North American Insulation Manufactureres Association (NAIMA) Publication #B1405 12/97.
"Grinnell Pipe Hangers" Grinnel Supply SalesCcompany Catalog PH–92.
"BHT Horizontal Traveler" Corner & Lada Co., Inc.

(List continued on next page.)

*Primary Examiner*—Hoang Nguyen
(74) *Attorney, Agent, or Firm*—Ryan Kromholz & Manion, S.C.

(57) ABSTRACT

In order to provide for coupling between the shell and the liner, a passive mounting system is provided. The passive mounting system uses indirect metal contact between the liner or liner panel and the shell. This design serves two main objectives: to minimize heat transfer between the hot gases and ultimately the exterior of the exhaust system; and to provide flexibility and mobility between liner components for changing stress and strain conditions, whether thermally related or otherwise. A passive mounted lining system comprising an outer shell, a liner support channel having a bolt slide void, a partially threaded bolt with a predetermined length of threads, and a series of thermal expansion compatible nuts, bolts, and washers, along with a liner channel support leg is disclosed. A method of mounting a liner system is also disclosed, the method comprising providing an outer shell, mounting on the outer shell a liner support channel having a bolt slide void, providing a partially threaded bolt with a predetermined length of threads in sliding engagement with the bolt slide void, mounting successively on the bolt a series of thermal expansion compatible nuts, bolts, spacers, and washers.

36 Claims, 7 Drawing Sheets

OTHER PUBLICATIONS

"Stampings", Phoenix Home Products, Feb. 27, 2000 http://www.phoenixspecialty.com/.

"Isolation Equipment for Gas Turbine Applications" WAHLCO Engineered Products 1995.

"Flex–Seat Guillotine Isolation Dampers" WAHLCO Engineered Products 1994.

"GTEx Gas Turbine Exhaust Systems and Components" WAHLCO Engineering Products.

* cited by examiner

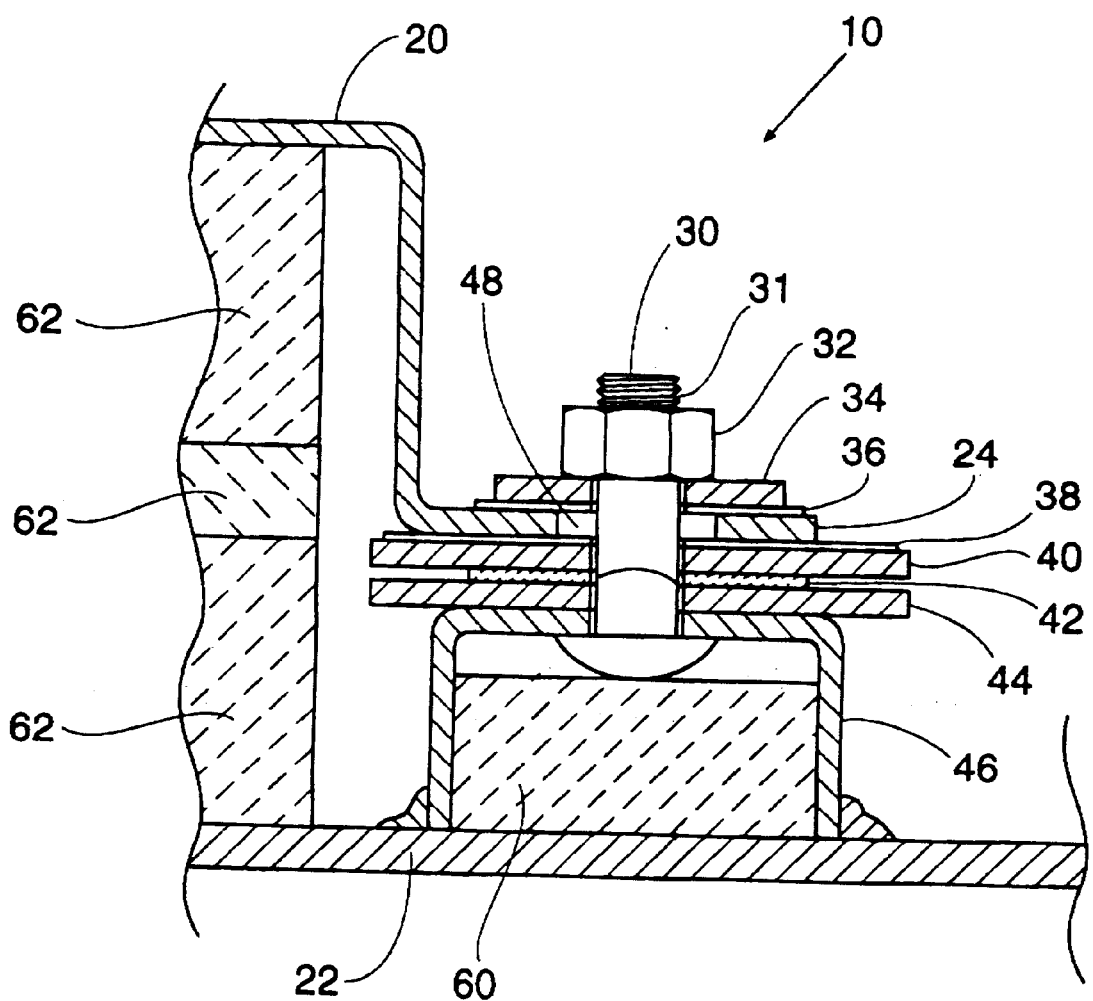
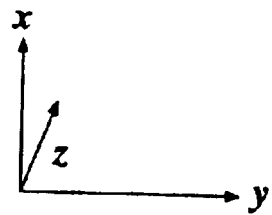

though the disclosure hereof is detailed and exact to enable those skilled in the art to practice the invention, the

PASSIVE MOUNTED LINING SYSTEM

This application claims the benefit of U.S. Provisional Application No. 60/193,742, filed Mar. 31, 2000.

FIELD OF THE INVENTION

This invention relates to liner and shell of thermally insulated walls that are used in the lined exhaust systems used to carry or direct hot air or exhaust gases.

BACKGROUND OF THE INVENTION

Typically, hot gases are produced as a result of a reaction or thermodynamic process such as those that are produced from combustion engines. One result of a combustion process is hot gases which range from temperatures between 750° F. and 2000° F. As these gases exit the thermodynamic process, they are exhausted into the atmosphere, a duct system and/or chimney or stack depending on the application. These are considered to be types of exhaust systems. Because these systems operate from several hours a day up to 24 hours per day for 20 or more years, it is imperative that the exhaust system components have the durability to withstand the extended and severe operating conditions to which they are subjected.

Generally, in industrial and commercial applications, a duct system and/or chimney or stack, depending on the application is accessible to workers. For safety purposes, surface temperature of equipment that is accessible to workers should be limited 140° F. as per ASTM C1055–99, which is recognized as the national consensus standard. This means that if the gases inside the exhaust system are greater than the allowable exterior duct temperature, the duct needs to be either cooled, shielded or insulated.

One method of insulating exhaust systems is through the use of a liner. A liner is a barrier that protects insulation applied inside a duct shell. Typically the liner is coupled to the shell while retaining the insulation necessary to reduce the heat transmitted to the exhaust system shell exterior. The liner is directly exposed to the heat from the hot gases being directed by the exhaust system. Since the liner is exposed to extremely high temperatures, thermal expansion often creates unusual problems such as warping and buckling.

Typical stresses in an exhaust system include broadband exhaust noise, low-frequency noise, thermal expansion and contraction, changes in operating conditions, rupture and creep stresses, earthquakes and other various environmental, acoustical and mechanical stresses and strains.

In order to support or mount a liner or liner panel in the exhaust system, the primary method is active mounting. Active mounting uses direct coupling by through metal contact between the liner and the inside of the shell. However, liners with active mounting may not respond well over time to changing stresses and strains as a result of direct exposure to heat.

SUMMARY OF THE INVENTION

In order to provide for coupling between the shell and the liner, a passive mounting system is provided. The passive mounting system uses indirect metal contact between the liner or liner panel and the shell. The through-metal contact, or direct contact, is insignificant for this method of mounting.

This design serves two main objectives: to minimize heat transfer between the hot gases and ultimately the exterior of the exhaust system; and to provide flexibility and mobility between liner components for changing stress and strain conditions, whether thermally related or otherwise.

A passive mounted lining system comprising an outer shell, a liner support channel having a bolt slide void, a partially threaded bolt with a predetermined length of threads, a lock washer with a void disposed thereon, a first washer with a void disposed thereon, a spacer with a void disposed thereon, a first graphite layer with a void disposed thereon, a liner panel having a liner panel void, a second graphite layer with a void disposed thereon, a second washer with a void disposed thereon, a nut with a void disposed thereon, wherein the liner support channel is carried by the outer shell, and wherein the partially threaded bolt is slidably engagable with the bolt slide void, and the bolt carries the lock washer, the first washer, the spacer, the first graphite layer, the liner panel, the second graphite layer, the second washer, and wherein the nut is threadedly engageable with the bolt.

One objective of the present invention is for the disclosed method and apparatus to capably withstand seismic loads, such as those possible in seismic zones 3 and 4 as described by ANSI and ASCE design standards.

A method of mounting a liner system is also disclosed, the method comprising providing an outer shell, mounting on the outer shell a liner support channel having a bolt slide void, providing a partially threaded bolt with a predetermined length of threads in sliding engagement with the bolt slide void, mounting successively on the bolt a lock washer, a washer, a spacer, a graphite layer, providing a liner panel having a liner panel void, mounting the liner panel on the bolt through the liner panel void, mounting on the bolt a graphite layer, a washer, and a nut. The method further comprises tightening the nut on the partially threaded bolt, while not binding the liner panel. The method further comprises peening exposed threads that extend vertically past the nut to prevent the nut from loosening, or welding one face of the nut to the second washer to accomplish the same objective. It should be noted that the nut, the washer, the liner panel, the graphite layer, the graphite layer, the spacer, the washer and the lock washer are all provided with voids larger in diameter than the bolt.

DESCRIPTION OF THE DRAWINGS

FIG. 2 is a side cross-sectional view of a passive mounting system;

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
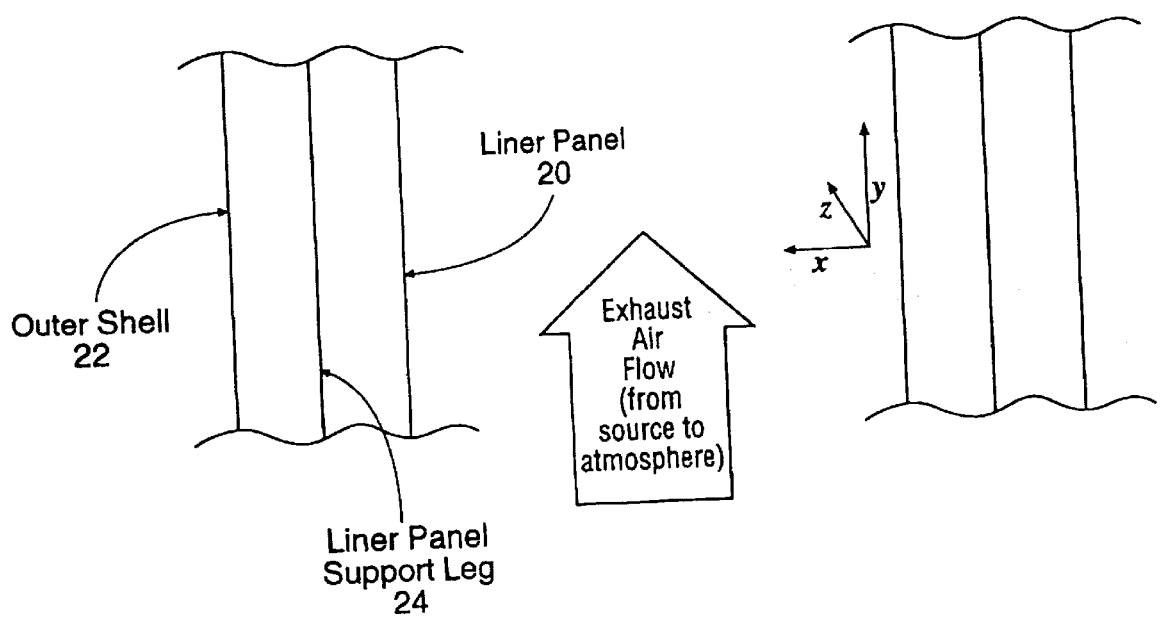
FIG. 1 is a cross sectional view of a typical exhaust stack, showing an outer shell, a liner or liner panels, and a liner panel support leg.

Referring now to FIG. 1 a cross sectional view of a typical exhaust system, showing an outer shell 22, a liner panel support leg 24, and a liner panel 20 or liner panels is shown.

For the purposes of describing the three dimensional aspects of the present invention, primary exhaust air flow direction will be in the y-direction, from the source to the atmosphere. In many instances, the y-direction will be vertical in an exhaust stack. The x-direction and the z-direction are each perpendicular to the y-direction, and in many instances will describe a horizontal plane in an exhaust stack. Planes are described as an xy-plane, an xz-plane, and a yz-plane. Mobility of the liner panels is desired in all three planes: the xy-plane, xz-plane, and yz-plane.

A passive mounting system, shown in FIG. 2, couples the mobile liner panel 20 with the fixed outer shell 22. The passive mounting system provides axial and radial mobility, and minimizes heat transfer between the hot gas and the outer shell.

Referring now to FIG. 2, a side cross-sectional view of a passive mounting system 10 is shown. The passive mounting system 10 allows the outer shell 22 of an exhaust system to be coupled passively with liner covers 26 (not shown) and a liner panel 20 through the liner panel support leg 24. Coupled to the outer shell 22 is a liner support channel 46. A bolt 30 with threads 31, when tightened with a nut 32, secures in sequential order as shown: a washer 34, a layer 36, the liner panel 20, a layer 38, a spacer 40, a washer 42, and a lock washer 44.

It is important that the components of the passive mounting system 10 react similarly to changing stress and strain conditions, such as heat. It is also important that the components of the passive mounting system minimize heat transfer along the yz-plane in the x-direction as shown in FIG. 2, or from top to bottom of the components shown in FIG. 2. For these reasons, components with compatible materials in relation to thermal expansion coefficients are preferable. For example but not by way of limitations, it has been found that suitable materials for the washer 34 and the spacer 40 are UNS S40930, or AISI 409, or AISI 304. 12 gauge material for liner panels 20 have been found to provide sufficient thermal resistance and strength to perform suitably under the stresses and strains common in exhaust system components. More particularly a stabilized ferretic stainless steel such as Allegheny 409HP, UNS S40930, or Armco 409, UNS S40920 may perform suitably.

The layers 36 and 38 are preferably comprised of materials that transmit heat laterally, or disperse heat, instead of transmitting the heat. Graphite has been found to perform suitably and advantageously for this purpose for the layer 36 and the layer 38. The washer 42 has been found to perform suitably when fabricated from ceramic paper, such as G/I-83 available from Gaskets, Inc. The ceramic paper is heat resistant, yet compressible enough to allow the components of the passive mounting system 10 to move slightly in response to changing stress and strain conditions. The lock washer 44 has been found to perform suitably when fabricated from carbon steel in 12 gauge.

In order to insulate the space inside the liner support channel 46, an insulation block 60 is provided. Insulation block 60 is preferably dense enough to partially hold bolt 30 in place and remain within liner support channel 46, yet soft enough to slightly deform underneath the head of bolt 30. One material that performs these functions suitably is Fibrex brand FBX 1900 insulation.

In order to insulate between successive passive mounts, which in use will be described later, insulation 62 is provided. Insulation 62 is shown in FIG. 2 as three distinct layers, although any different number of layers may perform suitably. Stratification and different orientation of insulation 62 is preferable to accommodate expansion and contraction as the passive mounting system 10 responds to changing stresses and strains. For instance, the insulation 62 may be required to compress and expand 5–10% or more when the passive mounting system 10 responds to rising and lowering temperatures. One insulation material that has suitable heat and compression characteristics is ceramic fiber.

This combination of mounting system 10 component materials have been found advantageous to providing mobility, perpendicular to the main gas flow direction, as well as axial mobility.

Figure 2A:
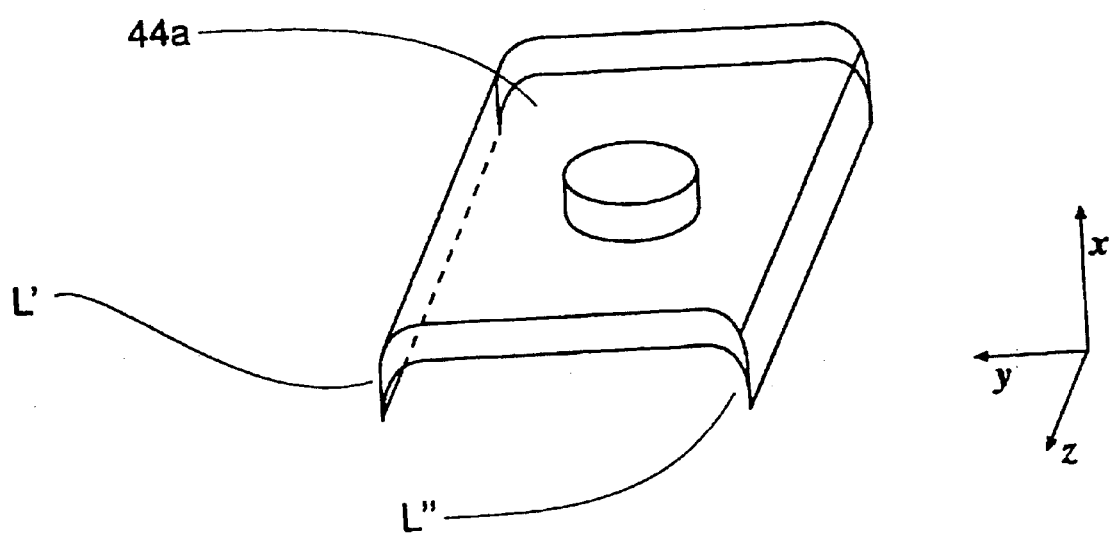
FIG. 2A is a perspective view of a lock washer.
Figure 3:
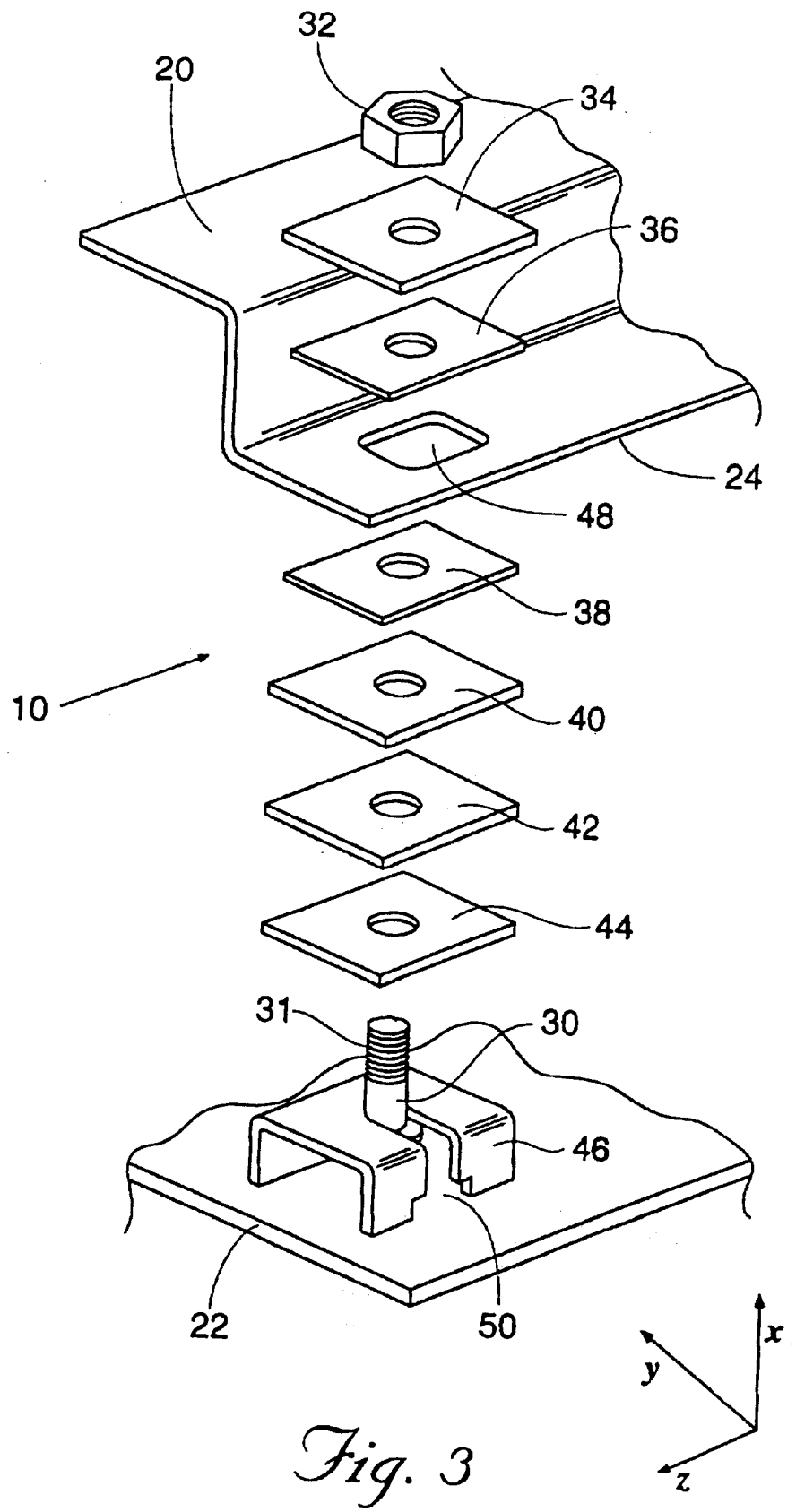
FIG. 3 is an exploded perspective view of a passive mounting system.

Referring now to FIG. 2A, an alternative, preferred embodiment of a lock washer 44a is shown. In this embodiment, overhanging lips 1' and 1" are provided in the x-direction to prevent the bolt 30 from disengaging with the liner support channel 46. When employed in the plurality of components in the x-direction as shown in FIG. 3, the overhanging lips 1' and 1" advantageously brace against rotation in the y-z plane, minimizing wear on components of the passive mounting system 10. The lips 1' and 1" are oriented so that one of the lips 1' or 1" covers at least a portion of bolt slide void 50. The other lip, the lip does not cover at least a portion of bolt slide void 50, braces against movement in the y-direction by bracing itself against the liner support channel 46.

Referring now to FIG. 3, an exploded perspective view of the passive mounting system 10 is shown, with a plurality of passive mounting system components shown roughly on the y-z planes. The components are preferably assembled in vertical order starting with the bolt 30, and stacking components vertically as shown. The layers 36 and 38 are provided for lubricity in order to minimize component wear and tear for those components that contact the liner panel support leg 24. Alternatively, in place of the layers 36 and 38, during assembly, the washer 34 and spacer 40 may be coated with lubricant to accomplish this objective.

Figure 3A:
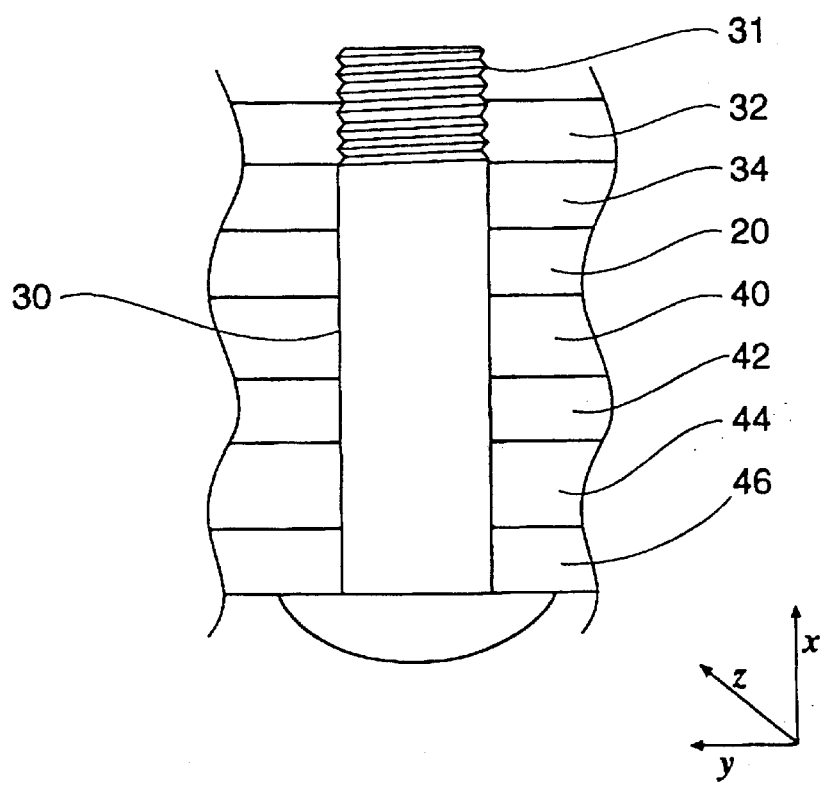
FIG. 3A is a side perspective view of an alternate plurality of passive mounting system components.

Referring now to FIG. 3A, a side perspective view of an alternate plurality of passive mounting system components is shown, with portions of components cut away. In this embodiment, select components of the previously described plurality of passive mounting system components have been omitted as can be seen by comparing FIG. 3 with FIG. 3A. In this alternate plurality of passive mounting system components, the components are arranged in the following order on the yz-plane in increasing x-direction, about the bolt 30 with threads 31: the liner support channel 46, the lock washer 44, washer 42, the spacer 40, the liner panel 20, the washer 34, and the nut 32. This arrangement may be preferable to simplify assembly of the components.

As FIGS. 3 and 3A show, the bolt 30 preferably has threads 31 only partially along the length of the bolt 30. The partial threading prevents the nut 32 from over-tightening during assembly to ensure axial mobility of liner panel 20 when exposed to heat, vibration and other noises common in the exhaust system. In order to prevent loosening of the nut 32 when exposed to the same forces, the threads 31 are preferably mechanically deformed, or peened, after the nut 32 has been tightened during assembly. Alternatively, welding of the nut to the bolt or washer, or any other means for preventing movement of the nut relative to the bolt may be performed. SAE J429, Grade 5 or ASTM A449 are materials that are suitable for construction of the bolt 30.

As FIG. 3 also shows, the liner support channel 46 is provided with a bolt slide void 50 in order that the longer bolt 30 may be engaged with the liner support channel 46 which is shorter than the bolt. Also, as will be described later, the liner panel void 48 provides mobility in the yz-plane. Also as FIG. 3 shows, the surface contact between the liner support channel 46 and the outer shell 22 is preferably minimized by providing small cross-sectional contact between the outer shell 22 and the liner support channel 46. As also shown on FIG. 3, the liner panel void 48 is shaped larger than voids provided on the washers 34 and 44 and washer 42 and spacer 40. The larger liner panel void 48 reduces potentially destructive shear forces that could result as the liner panel 20 moves in relation to the outer shell 22 during periods of above ambient heat exposure.

The larger liner panel void 48 is provided such that the liner panel 20 can move relative to the liner support channel 46 without shearing the bolt 30. This larger liner panel void 48 also eases assembly of the components by allowing fabrication in the yz-plane that an otherwise smaller sized void 48 would provide. Panels 20 are thus in free floating relationship.

Figure 3B:
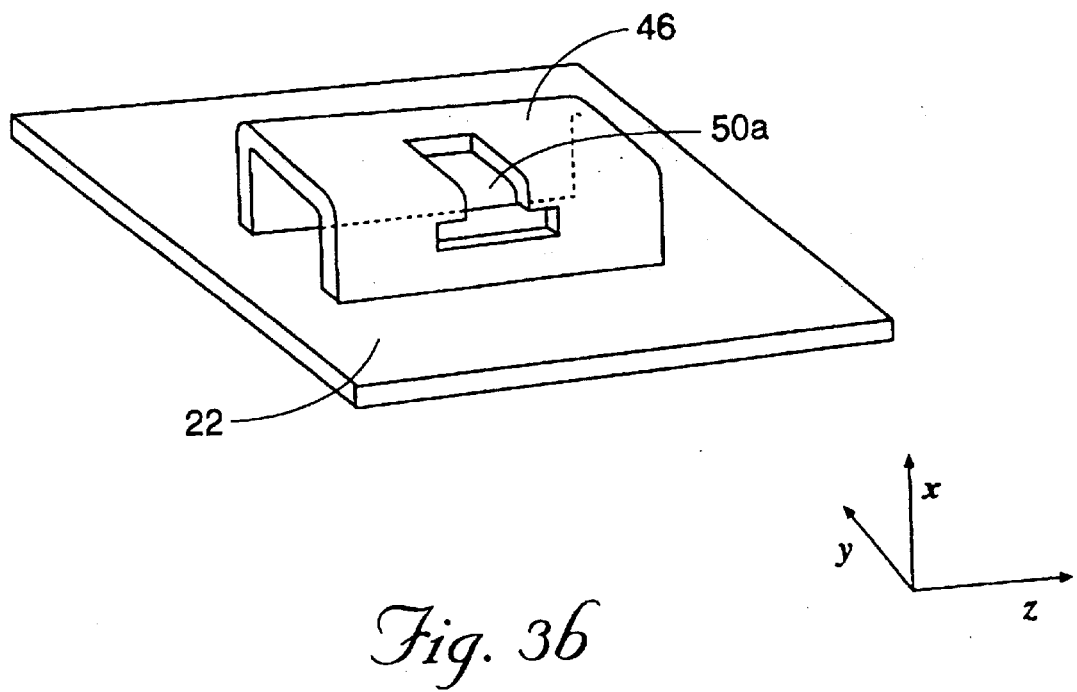
FIG. 3B is a side-elevational view of a liner support channel.

Referring now to FIG. 3B a side-elevational view of a liner support channel 46 is shown, with portions of outer shell 22 broken away. An alternate, preferred bolt slide void 50A is provided on liner support channel 46, such that liner support channel 46 is continuously coupled with outer shell along two lines in the yz-plane. Comparing the bolt slide void 50A shown in FIG. 3B with the bolt slide void 50 shown in FIG. 3, it can be seen that the preferred bolt slide void 50A shown in FIG. 3B is continuously coupled with the outer shell 22 in the z-direction. It has been found that this design improves structural strength of the liner channel 46.

Figure 4:
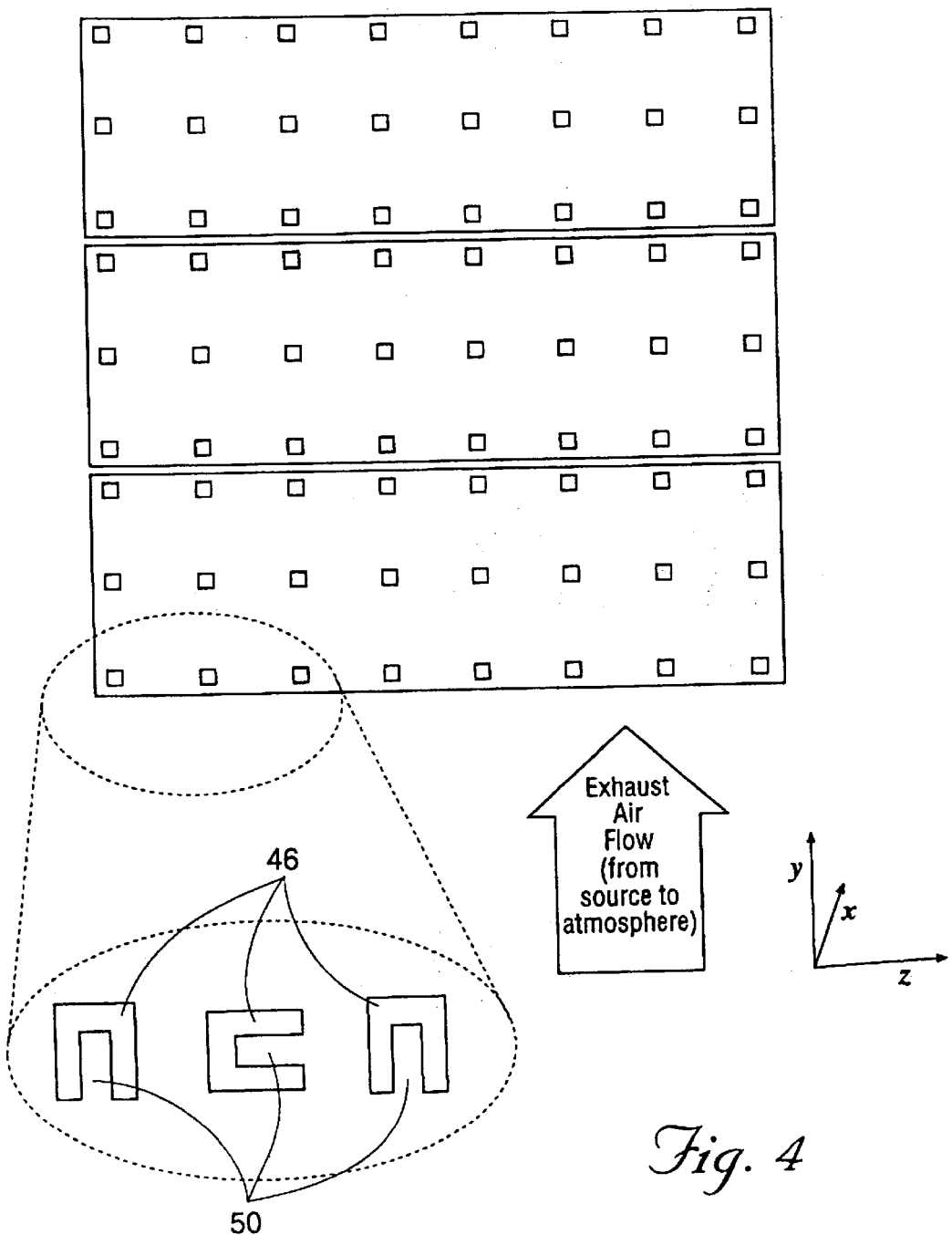
FIG. 4 is a side view of vertically stacked inside shells showing possible passive mounting system orientations and locations.

Referring now to FIG. 4, an inside to outside view of vertically stacked shells 22 showing possible passive mounting system 10 orientations and locations is shown. Viewing FIG. 4, a plurality of passive mounting systems 10 are disposed on a plurality of vertically stacked shells 22. The passive mounting systems 10 are provided in spaced-apart relationship to accommodate liner covers 26 (shown in FIG. 5) provided between adjacent liner panels 20. The mounting systems 10 are spaced apart in relation to receive liner panels 20 and liner covers 26. The geometry of the liner panels and liner covers may vary, thus controlling the specific geometry of the mounting system 10 deployment on the shells 22.

As can be seen from the exploded portion of FIG. 4, it is preferable that the passive mounting systems 10, and in particular the liner support channels 46 and bolt slide voids 50 be oriented differently between adjacent mounting systems 10. One pattern of orienting adjacent mounting systems 10 is shown in FIG. 4, where orientations are alternated in a 90 relationship between each two adjacent mounting systems 10. In one orientation, the liner channel 46, and particularly the bolt slide void 50 (shown) or bolt slide void 50A (not shown) is oriented to accept the bolt 30 from the direction of primary exhaust air flow direction in the y-direction. In an adjacent orientation for the mounting system 10, the liner channel 46, and particularly the bolt slide void 50 (shown) or bolt slide void 50A (not shown) is oriented to accept the bolt 30 from roughly 90° of the direction of primary exhaust air flow direction in the y-direction. This is only one preferred pattern of orienting adjacent mounting systems 10. Any pattern of orienting adjacent mounting systems 10 is acceptable, based on the preference of the fabricator.

This arrangement allows axial mobility, yet prevents mobility to the degree that the bolt 30 would become separated from the liner support channel 46. The 90 relationship is preferable for welders as it allows spacing to be measured accurately from edges of shells 22.

Figure 5:
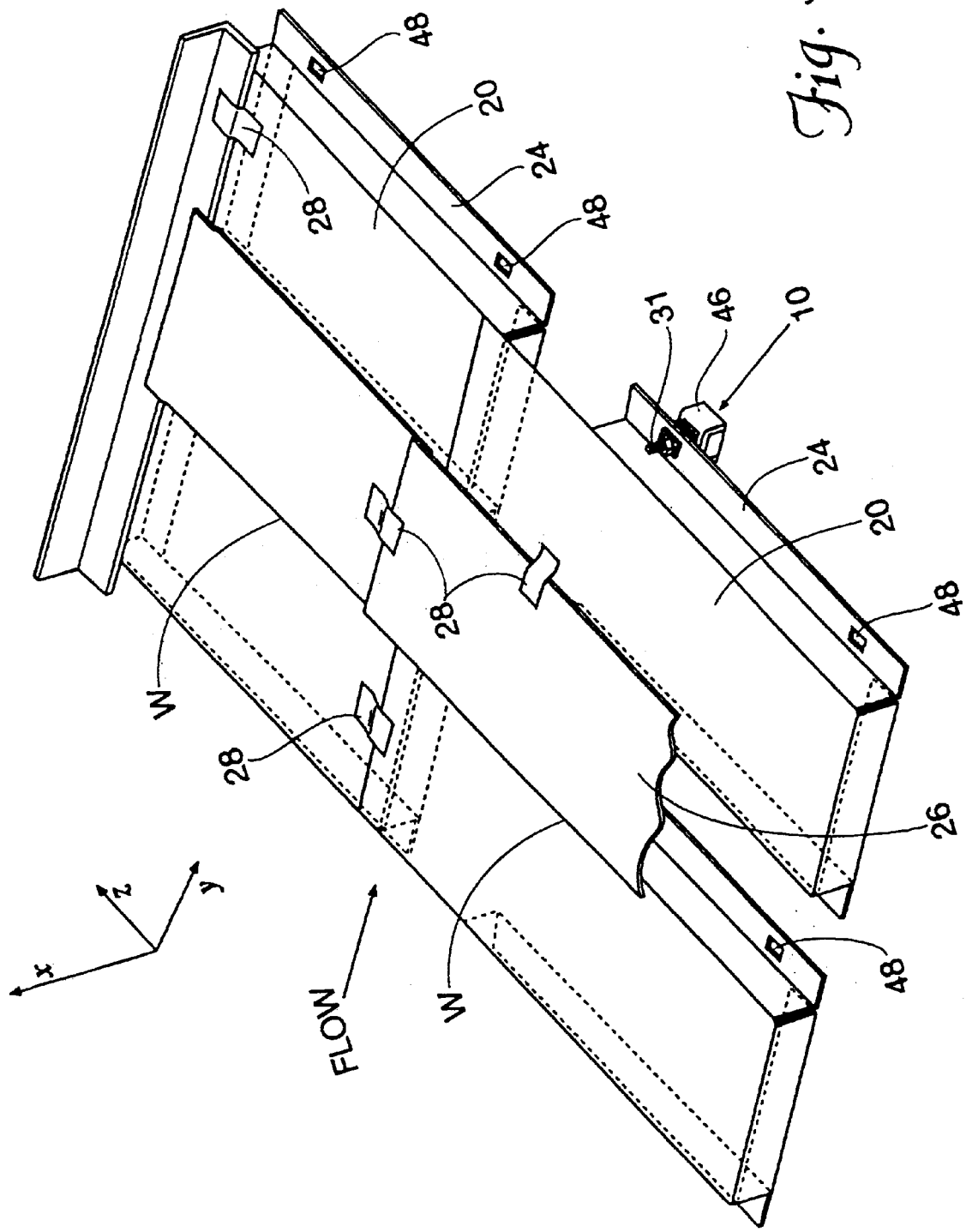
FIG. 5 is a perspective view with portions broken away, of a passive mounting system.

Referring now to FIG. 5, coupled with each liner panel 20 is an attachment mechanism, preferably a z-clip 28 to couple each liner panel 20 with one or more liner covers 26. In this manner each liner cover is coupled by z-clips to adjacent liner panels 20 and mounting systems 10. Additionally, it is preferable to couple liner covers 26 to liner panels 20. Preferably, this coupling is a weld. Suitable welds are stitch welds or fillet welds. One stitch weld that has performed particularly well is a 2 on 10 stitch weld. As FIG. 5 shows, the welds W are preferably positioned on an upstream portion of liner covers 26, coupled to a downstream portion of liner panels 20.

A method of mounting a liner system is also shown in FIGS. 2–5. The method comprises providing an outer shell 22, mounting on the outer shell 22 a liner support channel 46 having a bolt slide void 50, providing a partially threaded bolt 30 with a predetermined length of threads 31 in sliding engagement with the bolt slide void 50, mounting successively on the bolt 30 a lock washer 44, a washer 42, a spacer 40, a graphite layer 38, providing a liner panel 20 having a liner panel void 48, mounting the liner panel 20 on the bolt 30 through the liner panel void 48, mounting on the bolt 30 a graphite layer 36, a washer 34, and a nut 32. The method further comprises tightening the nut 32 on the partially threaded bolt. The method further comprises peening exposed threads 31 that extend vertically past the nut 32 to prevent the nut 32 from loosening. It should be noted that the nut 32, the washer 34, the graphite layer 36, the graphite layer 38, the spacer 40, the washer 42 and the lock washer 44 are all provided with voids larger in diameter than the bolt 30.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A passive mounted lining system comprising:
   an outer shell;
   a liner support channel having a bolt slide void;
   a partially threaded bolt with a predetermined length of threads;
   a first washer with a void disposed thereon;
   a liner panel having a liner panel void;
   a second washer with a void disposed thereon;
   a nut with a void disposed thereon;
   wherein the liner support channel is carried by the outer shell;
   and wherein the partially threaded bolt is slidably engagable with the bolt slide void, and the bolt carries the first washer, the liner panel, and the second washer;
   and wherein the nut is threadedly engageable with the bolt.

2. A passive mounted lining system according to claim 1, the passive mounted lining system further comprising insulation at least partially within the liner support channel.

3. A passive mounted lining system according to claim 1, wherein the nut is coupled to the bolt by a weld.

4. A passive mounted lining system according to claim 1, wherein at least a portion of the predetermined length of threads is deformed after threadedly engaging the nut to the bolt.

5. A passive mounted lining system according to claim 1, wherein the bolt slide void is oriented substantially parallel to a direction of primary air flow within an exhaust system.

6. A passive mounted lining system according to claim 1, wherein the bolt slide void is oriented substantially perpendicular to a direction of primary air flow within an exhaust system.

7. A plurality of passive mounted lining systems according to claim 1, wherein the bolt slide void is oriented randomly to a direction of primary air flow within an exhaust system.

8. A passive mounted lining system comprising at least two of the liner support channels of claim 1.

9. A passive mounted lining system according to claim 8, wherein the liner support channels are positioned in a spaced apart relationship.

10. A passive mounted lining system according to claim 9 wherein liner support channels are oriented in an alternating arrangement.

11. A passive mounted lining system according to claim 10 wherein the alternating arrangement is alternating between substantially perpendicular to a direction of primary air flow within an exhaust system and substantially parallel to the direction of primary air flow within the exhaust system.

12. A passive mounted lining system according to claim 1, the passive mounted lining system further comprising an insulating layer between the outer shell and the liner panel.

13. A passive mounted lining system according to claim 1, wherein the outer shell, the liner support channel, the partially threaded bolt, the first washer, the liner panel, the second washer, and the nut react complimentary to a change of air temperature within an exhaust system.

14. A passive mounted lining system according to claim 1, wherein the outer shell, the liner support channel, the partially threaded bolt, the first washer, the liner panel, the second washer, and the nut react complimentary to at least one of the group comprising a change of air temperature within an exhaust system, a change of broadband exhaust noise within the exhaust system, a change of low-frequency noise within the exhaust system, rupture stresses, creep stresses, and earthquakes.

15. A passive mounting system according to claim 1, wherein the outer shell is less than 140 F. during operation of an exhaust system carrying the passive mounting system.

16. A passive mounting system according to claim 1, the passive mounting system further comprising a spacer carried by the bolt.

17. A passive mounting system according to claim 1, wherein a lubricant is carried by at least one of the partially threaded bolt, the first washer, the liner panel, the second washer, and the nut.

18. A passive mounting system according to claim 17 wherein the lubricant is graphite.

19. A passive mounting system according to claim 1, wherein the liner panel void is larger than a diameter of the bolt.

20. A method of mounting a liner system onto a shell, the method comprising:
providing an outer shell;
mounting on the outer shell a liner support channel having a bolt slide void;
providing a partially threaded bolt with a predetermined length of threads in sliding engagement with the bolt slide void;
providing a liner panel having a liner panel void;
mounting successively on the bolt a first washer, the liner panel through the liner panel void, a second washer, and a nut.

21. The method of claim 20, the method further comprising tightening the nut on the partially threaded bolt.

22. The method of claim 21, the method further comprising peening exposed threads that extend vertically past the nut.

23. The method of claim 21, the method further comprising welding the nut to the bolt.

24. A coupling system between a shell and a liner of an exhaust system, the coupling system comprising:
a liner support channel;
a plurality of mounting system components carried by the liner support channel;
a means for retaining the mounting system components in a stacked relationship with the liner support channel;
wherein the shell carries the liner support channel; and
wherein the means for retaining the plurality of mounting system components in a stacked relationship also retains at least a portion of the liner.

25. A coupling system according to claim 24, the liner support channel further comprising a means for accepting the means for retaining the mounting system components in a stacked relationship with the liner support channel.

26. A coupling system according to claim 24, the coupling system further comprising an insulation layer between the shell and the liner.

27. A coupling system according to claim 24, the coupling system further comprising an insulation layer between the shell and at least a portion of the liner support channel.

28. A coupling system according to claim 24, the plurality of mounting system components comprising:
a lock washer,
a first washer,
a spacer,
and a second washer.

29. A coupling system according to claim 28, wherein at least a portion of the liner is carried between the lock washer and the second washer.

30. A coupling system according to claim 28, the lock washer comprising a planar body with a void disposed thereon, and a lip coupled substantially perpendicularly to said planar body on an edge of the planar surface.

31. A coupling system according to claim 30, wherein the lip is oriented facing a direction of primary air flow within an exhaust system carrying the coupling system.

32. A coupling system according to claim 24, wherein the plurality of mounting system components react complimentary to at least one of the group comprising a change of air temperature within an exhaust system, a change of broadband exhaust noise within the exhaust system, a change of low-frequency noise within the exhaust system, rupture stresses, creep stresses, and earthquakes.

33. A coupling system according to claim 24, wherein the plurality of mounting system components and the liner and the shell react complimentary to at least one of the group comprising a change of air temperature within an exhaust system, a change of broadband exhaust noise within the exhaust system, a change of low-frequency noise within the exhaust system, rupture stresses, creep stresses, and earthquakes.

34. A coupling system according to claim 24, wherein the shell is less than 140° F. during operation of an exhaust system carrying the coupling system.

35. A passive mounted lining system comprising at least two of the coupling systems of claim 24.

36. A passive mounted lining system according to claim 33 wherein liner support channels are not uniformly oriented in relation to a direction of primary air flow within an exhaust system carrying the passive mounted lining system.

\* \* \* \* \*